US010984484B1

(12) United States Patent
Nidecker et al.

(10) Patent No.: US 10,984,484 B1
(45) Date of Patent: Apr. 20, 2021

(54) ACCOUNTING WORKFLOW INTEGRATION

(71) Applicants: Priscilla Jane Nidecker, Mountain View, CA (US); Michael D. Rundle, Raleigh, NC (US); Thomas Alan Lee, Foster City, CA (US); Harpreet Hira, Plano, TX (US); Shailesh Mishra, Plano, TX (US); Harsha Jagadish, Fremont, CA (US); Keerthi Kumar Arutla, Fremont, CA (US); Mohan Naik, San Ramon, CA (US); Enrique Barragan, East Palo Alto, CA (US); Brad Sinclair, San Francisco, CA (US)

(72) Inventors: Priscilla Jane Nidecker, Mountain View, CA (US); Michael D. Rundle, Raleigh, NC (US); Thomas Alan Lee, Foster City, CA (US); Harpreet Hira, Plano, TX (US); Shailesh Mishra, Plano, TX (US); Harsha Jagadish, Fremont, CA (US); Keerthi Kumar Arutla, Fremont, CA (US); Mohan Naik, San Ramon, CA (US); Enrique Barragan, East Palo Alto, CA (US); Brad Sinclair, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 216 days.

(21) Appl. No.: 15/663,648

(22) Filed: Jul. 28, 2017

(51) Int. Cl.
*G06Q 40/00* (2012.01)
*G06Q 10/06* (2012.01)
(Continued)

(52) U.S. Cl.
CPC ............. *G06Q 40/12* (2013.12); *G06F 3/048* (2013.01); *G06F 3/0482* (2013.01);
(Continued)

(58) Field of Classification Search
CPC combination set(s) only.
See application file for complete search history.

(56) References Cited

U.S. PATENT DOCUMENTS 8,046,477 B1 * 10/2011 Arutla ...................... G06F 9/50
709/220
8,433,650 B1 * 4/2013 Thomas ................ G06Q 10/06
705/38

(Continued)

*Primary Examiner* — Crystol Stewart
(74) *Attorney, Agent, or Firm* — Ferguson Braswell Fraser Kubasta PC

(57) ABSTRACT

A method of accounting workflow integration includes receiving, by a workflow user interface, a first request from a first worker to generate a project including multiple accounting tasks. The first request includes an assignment of an accounting task in the accounting tasks to a second worker. The method further includes generating the project in response to the request, and providing, by the workflow user interface to the second worker, the accounting task and a deadline to complete the accounting task. The method further includes accounting software of the second worker completing the accounting task, and updating a status of the accounting task in response to completing the accounting task. The method further includes receiving a second request from the first worker, the second request to display a status of the project, and providing, to the first worker in the workflow user interface, an updated status of the project.

20 Claims, 10 Drawing Sheets

(51) Int. Cl.
  *G06Q 10/10* (2012.01)
  *G06F 3/048* (2013.01)
  *G06F 3/0482* (2013.01)

(52) U.S. Cl.
  CPC ... *G06Q 10/067* (2013.01); *G06Q 10/063114* (2013.01); *G06Q 10/103* (2013.01); *G06Q 10/1093* (2013.01); *G06Q 10/1095* (2013.01)

(56) References Cited

U.S. PATENT DOCUMENTS

| | | | | |
|---|---|---|---|---|
| 2003/0097296 | A1* | 5/2003 | Putt | G06Q 10/06 705/7.23 |
| 2004/0030590 | A1* | 2/2004 | Swan | G06Q 10/04 705/7.22 |
| 2004/0143477 | A1* | 7/2004 | Wolff | G06Q 10/06316 705/7.26 |
| 2005/0065836 | A1* | 3/2005 | Tanaka | G06Q 10/063118 705/7.17 |
| 2008/0027920 | A1* | 1/2008 | Schipunov | G06F 16/2471 |
| 2010/0017699 | A1* | 1/2010 | Farrell | G06F 3/0482 715/227 |
| 2011/0071869 | A1* | 3/2011 | O'Brien | G06Q 10/06 705/7.12 |
| 2011/0252382 | A1* | 10/2011 | Bhaskaran | G06Q 10/06 715/853 |
| 2012/0053978 | A1* | 3/2012 | Andersen | G06Q 10/06 705/7.14 |
| 2012/0144315 | A1* | 6/2012 | Rosenberger | G06F 16/164 715/748 |
| 2012/0215578 | A1* | 8/2012 | Swierz, III | G06Q 50/205 705/7.14 |
| 2014/0157110 | A1* | 6/2014 | Abbott, Jr. | G06Q 40/12 715/234 |
| 2014/0281967 | A1* | 9/2014 | Bodnick | G06Q 10/06316 715/708 |
| 2015/0135300 | A1* | 5/2015 | Ford | G06F 16/93 726/11 |
| 2015/0293677 | A1* | 10/2015 | Fong | G06F 3/0482 715/717 |
| 2016/0034827 | A1* | 2/2016 | Morris | G06Q 10/109 705/5 |
| 2016/0063421 | A1* | 3/2016 | Singh | G06Q 10/06316 705/7.26 |
| 2016/0147403 | A1* | 5/2016 | Koch | G06F 3/0482 715/739 |
| 2017/0085520 | A1* | 3/2017 | Umapathy | G06F 3/04842 |
| 2017/0103362 | A1* | 4/2017 | Choi | G06Q 10/063114 |
| 2017/0116552 | A1* | 4/2017 | Deodhar | G06Q 10/06316 |
| 2017/0116669 | A1* | 4/2017 | Wickstrom | G06Q 40/025 |
| 2017/0249574 | A1* | 8/2017 | Knijnik | G06Q 10/06313 |
| 2017/0315689 | A1* | 11/2017 | Myhre | G06F 3/0482 |

\* cited by examiner

FIG. 8

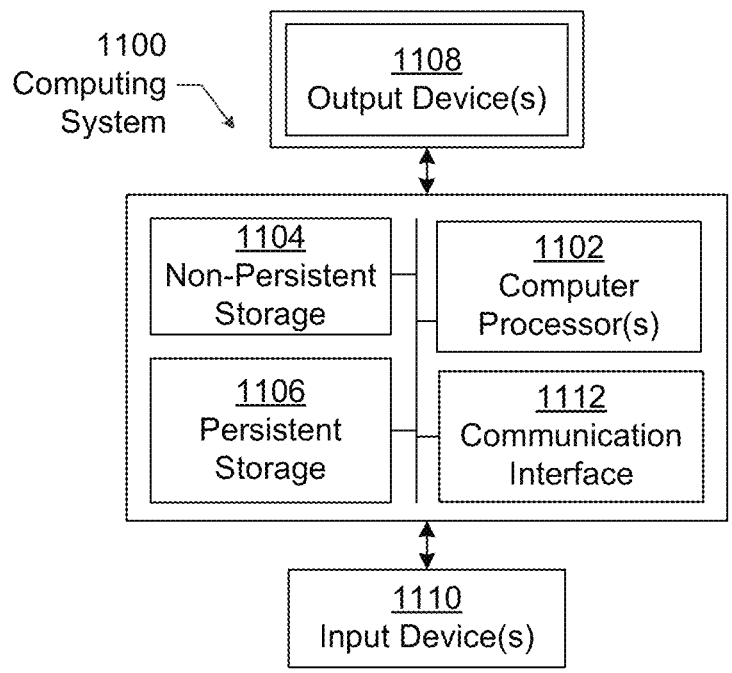
*FIG. 11.1*
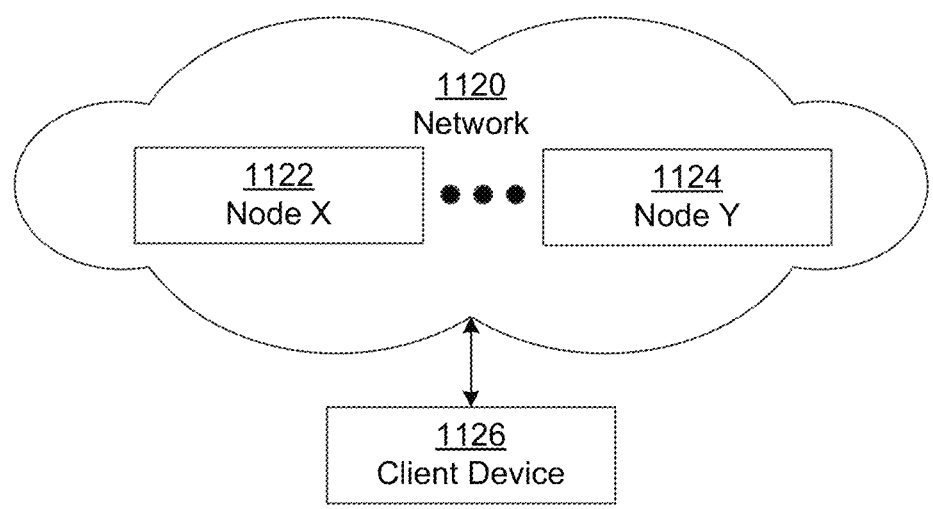
*FIG. 11.2*

US 10,984,484 B1

ACCOUNTING WORKFLOW INTEGRATION

BACKGROUND

Accounting firms perform various accounting functions. The accounting functions of the accounting firm are deadline driven. In other words, each item that accountant performs has a corresponding deadline by which failure to perform the item may result in fines or the loss of a client. Accounting functions are also partitioned into multiple discrete accounting tasks that must be performed to complete the accounting function. For example, to perform payroll just one time for one client, ten date based accounting tasks may be needed to complete the single execution of payroll. Because individual workers in the accounting firm may have a number of clients, and perform a number of accounting functions to perform for each client, the workers may have a multitude of deadlines to manage.

Accounting firms may have various tools to manage the operations of the accounting firm. For example, the tools may include physical tools (e.g., whiteboards, calendars, papers ledgers), virtual tools (e.g., various software products), and meetings. Management of deadlines includes having the workers updating the various tools. For example, when the worker completes an accounting task, the worker may mark the accounting task as completed on the calendar. Failure of the worker to update the calendar when new accounting tasks are added or when an accounting task is completed may cause the calendar to be out of synchronization with the work that the worker has to perform.

SUMMARY

In general, in one aspect, one or more embodiments relate to a method of accounting workflow integration. The method includes receiving, by a workflow user interface, a first request from a first worker to generate a project including multiple accounting tasks. The first request includes an assignment of an accounting task in the accounting tasks to a second worker. The method further includes generating the project in response to the request, and providing, by the workflow user interface to the second worker, the accounting task and a deadline to complete the accounting task in response to the assignment. The method further includes accounting software of the second worker completing the accounting task, and updating a status of the accounting task in response to completing the accounting task. The method further includes receiving a second request from the first worker, the second request to display a status of the project, and providing, to the first worker in the workflow user interface, an updated status of the project, where the updated status shows the completed status.

In general, in one aspect, one or more embodiments relate to a system for integrating accounting task management with accounting software. The system includes a computer processor, accounting software of a second worker executing on the computer processor, and a workflow user interface executing on the computer processor. The accounting software is configured to complete an accounting task in multiple accounting tasks, and update a status of the accounting task in response to completing the accounting task. The workflow user interface is configured to receive a first request from a first worker to generate a project including the accounting tasks, the first request including an assignment of an accounting task in the accounting tasks to the second worker, generate the project in response to the request, and provide, to the second worker, the accounting task and a deadline to complete the accounting task in response to the assignment. The workflow user interface is further configured to receive a second request from the first worker, the second request to display a status of the project, and provide, to the first worker in the workflow user interface, an updated status of the project, the updated status showing the completed status.

In general, in one aspect, one or more embodiments relate to a non-transitory computer readable medium including computer readable program code for causing a computer system to receive a first request from a first worker to generate a project including multiple accounting tasks, the first request including an assignment of an accounting task in the accounting tasks to a second worker, generate the project in response to the request, provide the accounting task and a deadline to complete the accounting task in response to the assignment, complete, while connected to the second worker, the accounting task, and update a status of the accounting task in response to completing the accounting task. The computer readable program code is further for causing the computer system to receive a second request from the first worker, the second request to display a status of the project, and provide, to the first worker, an updated status of the project, the updated status showing the completed status.

Other aspects of the invention will be apparent from the following description and the appended claims.

BRIEF DESCRIPTION OF DRAWINGS

FIGS. 8, 9, and 10 show examples in accordance with one or more embodiments of the invention.

FIGS. 11.1 and 11.2 show a computing system in accordance with one or more embodiments of the invention.

DETAILED DESCRIPTION

Figure 1:
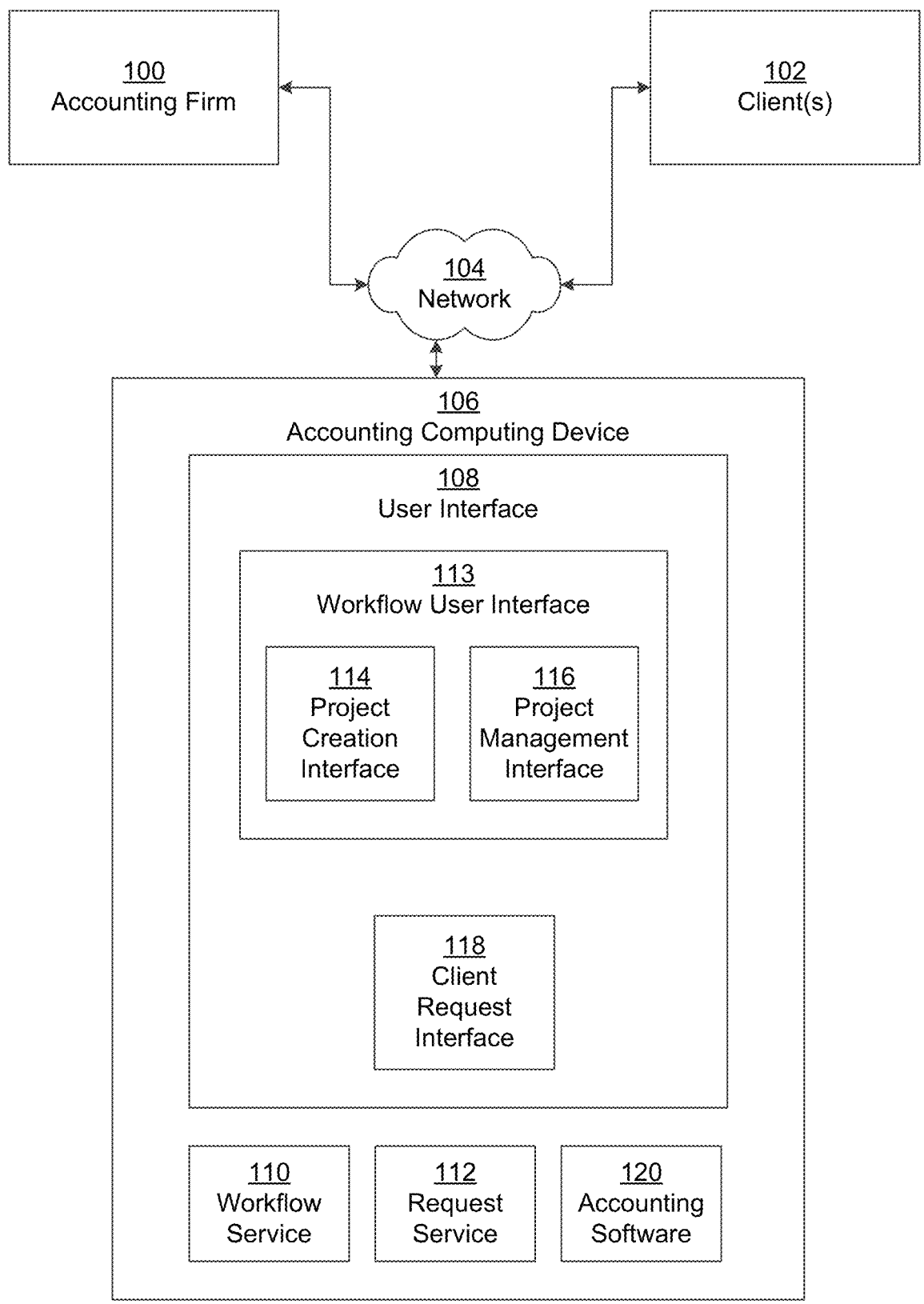
FIGS. 1, 2, and 3 show diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention integrate the software to perform accounting functions with software to manage the deadlines by which the accounting functions are performed. Further, one or more embodiments provide a unified tool to create and maintain deadlines for the accounting tasks. The unified tool may embody multiple tools in a single tool creating a unified view. The unified tool may maintain deadlines across the workers of the accounting firm and integrate with each worker's user of accounting software. Thus, the unified view spans the accounting firm and accounting software to synchronize the status of the various accounting functions performed with the tools used to perform the accounting functions regardless of the worker performing the accounting functions.

Turning to the figures, FIG. 1 is a diagram of a system in accordance with one or more embodiments of the invention. As shown in FIG. 1, the system may include one or more clients (102), an accounting firm (100), and an accounting computing device (106). The various components may be connected via a network (104). Each of these components is described below.

A client (102) is any individual, business, or other entity who is a customer of the accounting firm (100). The client may have a name and a type. The client name is an identifier of the client. For example, the client name may be the "doing business as" name, the incorporation name, or other name. The type may be the type of accounting functions performed for the client. By way of another example, the type may be the industry served by the client. For example, the industries served may include accounting or bookkeeping, advertising or public relations, agriculture, art/writing/photography, automotive sales or repair, church or religious organization, construction general contractor, construction trades, design/architecture/engineering, financial services other than accounting or bookkeeping, hair salon or beauty salon or barber shop, information technology, insurance agency or broker, lawn care or landscaping, or other industry or a combination thereof.

The accounting firm (100) is a business entity or portion of a business entity that performs accounting functions for one or more clients (102). Although FIG. 1 shows the accounting firm (100) as separate from the client(s) (102), the accounting firm (100) may be a department of a client (102). The accounting functions performed by the accounting firm (100) may manage cash flow, payroll, book keeping (e.g., maintaining accounting records), preparing and filing financial statements with one or more government and private entities, preparation and filing of tax related documents, auditing existing records, and/or performing other such accounting tasks to monitor, analyze, report the finances of a client, or any combination thereof.

The accounting firm (100) has various workers. The workers are individuals (e.g., employees, contractors) who perform work for the accounting firm (100). Workers have roles within the accounting firm. The role defines the duties of the workers. For example, a worker may be an owner. The owner is responsibility for maintaining the accounting firm. As another example, a worker may be an accounting clerk. The accounting clerk may be responsible for recording financial transactions and performing clerical functions. The accounting staff may include functionality to generate financial reports, prepare and analyze budgets, perform book-keeping, and perform other such accounting functions. The accountant is responsible for ensuring the timely completion and accuracy of the accounting functions. For example, the accountant may be a certified public accountant. The accountant may be responsible for reviewing the work performed by the accounting clerk and the accounting staff. Further, the accountant may perform additional accounting functions. As used herein, a user refers to any worker of the accounting firm (100) that is interfacing with the user interface (108) of the accounting computing device (106).

The accounting firm (100) and the client(s) (102) may be connected to a network (104). In particular, one or more of the various computing devices of the accounting firm (100) and the client(s) may be communicatively connected, temporarily or permanently, to network (104). For example, the network (104) may be any interconnection of devices that is configured to transmit communications between various endpoints (e.g., client(s) (102), accounting firm (100), accounting computing device (106)).

The accounting computing device (106) is a physical or virtual computing device (e.g., virtual machine executing on a physical machine) that includes functionality to perform accounting functions and management of the accounting functions. Examples of the accounting computing device are described below.

The accounting computing device (106) includes functionality to execute a user interface (108) and a workflow manager (110). Both of these components are described below. The user interface (108) includes functionality to provide information to a user and receive input from a user. For example, the user interface (108) may be a graphical user interface. The user interface (108) includes a workflow user interface (113) and a client request interface (118).

The workflow user interface (113) is a user interface that interacts with users to manage an accounting workflow. In particular, the workflow user interface (113) allows users to create and view projects and accounting tasks. The workflow user interface (113) includes a project creation interface (114) and a project management interface (116). The project creation interface (114) is a user interface to create a new project. The project creation interface (114) may include multiple fields to specify the project name, the client identifier, the due date, the status, a project description, and an assigned person for the project. The project name is the title for the project. For example, the project name may be "monthly books," "payroll," or other name. The due date is the date in which the entire project should be or is required to be completed. The status is the current state of the overall project. For example, the status may be "not yet started," "waiting on client," the number of accounting tasks (described below) of the project completed, "completed" or other status identifier. The project description is a full description of the project. The client identifier is a unique identifier of the client. For example, the client identifier may be a business name of a client, an assigned alphanumeric identifier, or other unique identifier. The assigned person is the person responsible for the project being completed.

Additionally, the project creation interface (114) may include accounting tasks for the project. In other words, the project may be composed of one or more accounting tasks. In at least some embodiments, the project may include non-accounting tasks, where the non-accounting tasks may be specified via the project creation interface (118). Each accounting task is a discrete unit of work, whereby completion of the accounting task is part of completing a project. Accounting tasks may be predefined (e.g., as a default in the accounting application, by a user saving the set of accounting tasks for the project type) or may be defined by the user for the particular project. Accounting tasks may include an accounting task name, a due date, a description, an assigned person, and a status. The accounting task name is the title for the accounting task. The due date is the date at which the accounting task should be or is required to be completed. The description describes the accounting task. The assigned person is the unique identifier of the person who is assigned to complete the accounting task. The assigned person for one or more of the accounting tasks may be different than the assigned person for one or more of the projects. In particular, the person responsible for the project completion may be different than the person responsible for completing the individual accounting tasks. Continuing with the accounting task information, the status is the current state of the accounting task. For example, the status may be not yet started, in progress, completed, or blocked. Additionally, an accounting task may also inherit a client name from the project to which the accounting task belongs. Due date for the accounting task may be pre-defined based on the project due date. For example, the due date for the accounting task may be calculated based on the due date for the project.

The project creation interface (114) includes functionality to guide a user through the creation of a project. In particular, the project creation interface includes user interface widgets and prompts that lead a user to defining a project and adding an accounting task to the project. The project creation interface (114) may further include functionality to duplicate a particular project to create a new project. In other words, a user may perform a single selection of a user interface widget and create a new project based on an existing or prior performed project. Further, the project creation interface (114) may further allow the user to edit the newly created project. The project creation interface (114) may further include functionality to mark accounting tasks and/or projects as recurring, and specify the interval of recurrence. For example, payroll that is performed biweekly may be defined in the project creation interface as a recurring project. In the example, a payroll project may be created that is due every two weeks.

In one or more embodiments, the project creation interface (114) may be configured to create multiple projects based on the type of client. In particular, the project creation interface may include user interface widgets that allow the user may specify the name of the client and the type of the client (e.g., book keeping, federal and state taxes, etc.). The project creation interface (114) may further include a user interface widget that, when selected, automatically creates the projects and corresponding accounting tasks for the particular client based on the client type.

The project management interface (116) is a user interface that provides the user with accounting task lists and project lists that is in the user's work queue. The project management interface (116) includes functionality to filter the information for the particular user. For example, for a user in the role of accounting staff, the project management interface (116) only provides accounting task lists and project lists assigned to the user. For a user in the role of accountant, the project management interface provides accounting task lists and project lists for which the accountant is responsible. The project management interface (116) may further include user interface widgets that filter, upon selection, the view provided to the accountant to accounting tasks assigned to a particular worker, accounting tasks and projects specifically assigned to the accountant to perform, or to only projects. Additionally, the project management interface (116) may include user interface widgets that filter, upon selection, projects and accounting tasks for particular clients. The project management interface (116) may include functionality to provide an owner view to the owner of the accounting firm. The owner view may span the projects and accounting tasks of the accounting firm (100). For example, the owner view may span the entire accounting firm (100).

The project management interface (116) may be configured to tailor the view according to the level of granularity selected by the accountant and/or owner. For example, the owner may desire to see projects and due date for projects, but not individual accounting tasks. One or more embodiments provide selective granularity of the information displayed in the project management interface (116). In particular, by selecting the corresponding user interface widget in the project management interface (116), the project management interface provides the information at the level of granularity requested. Accordingly, the accountant, accounting staff, and owner are able to view the accounting tasks and projects in a manner that is specific to the respective user.

As described above, accounting functions, including projects and accounting tasks, are deadline driven. The project management interface (116) includes functionality to organize and provide each accounting task and project according to the corresponding deadline. The project management interface (116) may include multiple views, where each view organizes the accounting tasks and/or projects. In a calendar view, the project management interface shows accounting tasks and/or projects organized by date regardless of the worker to which the accounting task and/or project is assigned. For example, a column based calendar view may be partitioned into multiple columns. The first column may show accounting tasks and/or projects due during the current week organized by date. The next column may show accounting tasks and/or projects due during the following week and organized by date, and so forth. The calendar view may be a month calendar with the information about the projects and/or accounting tasks superimposed on the corresponding deadline of the month. The month calendar shows each day of the month partitioned into weeks and weeks partitioned into months. In another embodiment, one or more accounting functions are not deadline driven, such as associating financial transactions to a project for generating reports.

A worker view may show accounting tasks and/or projects organized by worker. For example, a first column may show accounting tasks and/or projects due for a first worker, a second column may show accounting tasks and/or projects due for a second worker, etc. Workers may be in one column but may be interleaved in multiple columns. Each column may be sorted by due date. Thus, an accountant may see the various accounting tasks and/or projects assigned to each accounting staff member. Further, the owner may see the various accounting tasks and/or projects assigned to the various workers including the various accountants.

A client view may show the accounting tasks and/or projects organized by client. For example, a first column may show accounting tasks and/or projects due for a first client, a second column may show accounting tasks and/or projects due for a second client, etc. Each column may be organized by due date.

In the project management interface (116), the accounting tasks and/or projects are each shown on a respective virtual card. In one or more embodiments, the card is a rectangular shaped object that includes various data items of the respective accounting task and/or project, whereby each data item is shown at a corresponding level of prominence and has a corresponding position. For example, the card may include due date, client name, project and/or accounting task name, status, and assigned worker. For the status of a project, the status may be a number of accounting tasks completed in the project as compared to the total number of accounting task. In one or more embodiments, the status is shown as a status bar. The proportion of the status bar with a predefined fill corresponds to is the same as the proportion of the overall project and/or accounting task completed. The project management interface (116) displays the various data items about the project and/or accounting task at a level of prominence based on the importance of the piece of information. The level of prominence may be shown based on font, font size, and position. For example, a higher level of prominence may be displayed in larger font and/or farther from other data items. Less prominent data items may appear smaller. Importance can be determined by the nearness of the deadline or due date, where nearer deadlines are more prominently displayed. For example, the due date may be more prominently displayed then the client name and name of accounting task and/or project.

The project management interface (116) may further include functionality to present a list view. The list view presents the various data items in a single list rather than in the column format described above or calendar form. Users may sort by client, name, status, due date or deadline, type, etc. Users may also filter by client or project. In another embodiment, list view may show completed items, or items completed before or beyond today.

The client request interface (118) is a user interface that includes functionality to generate client requests and provide client requests to a client. A client request is a request for one or more pieces of documentation or information that may be used to complete an accounting task and/or project. One or more embodiments include functionality to generate client requests, communicate with clients, and track when the client has completed the various parts of the request. On the worker side, the client request interface (118) guides the user to creating a client request and then updates the user on the status of the client request. For creating the client request, the client request interface includes various user interface widgets to specify a name of the request, the client name, the due date, the status, and details about the request. The client request interface may further include functionality to provide a draft communication (e.g., email, text message, etc.) to the worker creating the request for approval. The client request interface (118) may further integrate with an accounting application of the client to alert the client of the new request. The accounting application may include a client side of the client request interface that includes functionality to upload documents, provide the information, and send tailored communication to the client.

Continuing with the accounting computing device of FIG. 1, the accounting computing device (106) includes a workflow service (110) and a request service (112). The workflow service (110) is communicatively connected to the workflow user interface. The workflow service (110) includes functionality to manage the workflow for the user. In other words, the workflow service (110) performs the backend operations to update workflow user interface (113).

The request service (112) includes functionality to perform the backend operations to manage client requests. In particular, the request service interface provides communication channels, tracks status, and manages documents related to client requests between the workers and the clients. The workflow service is described below in relation to FIG. 2 and the request service is described below in relation to FIG. 3.

Continuing with FIG. 1, accounting software (120) is a software application that performs accounting functions. For example, the accounting software (120) may include functionality to track income, organize expenses, manage tax deductions, generate financial reports, send invoices and estimates, track sales tax, manage bills, track time, record accounting information, process payroll, and perform other accounting functions. The accounting software (120) may be configured to interface with the various workers of the accounting firm (100).

Figure 2:
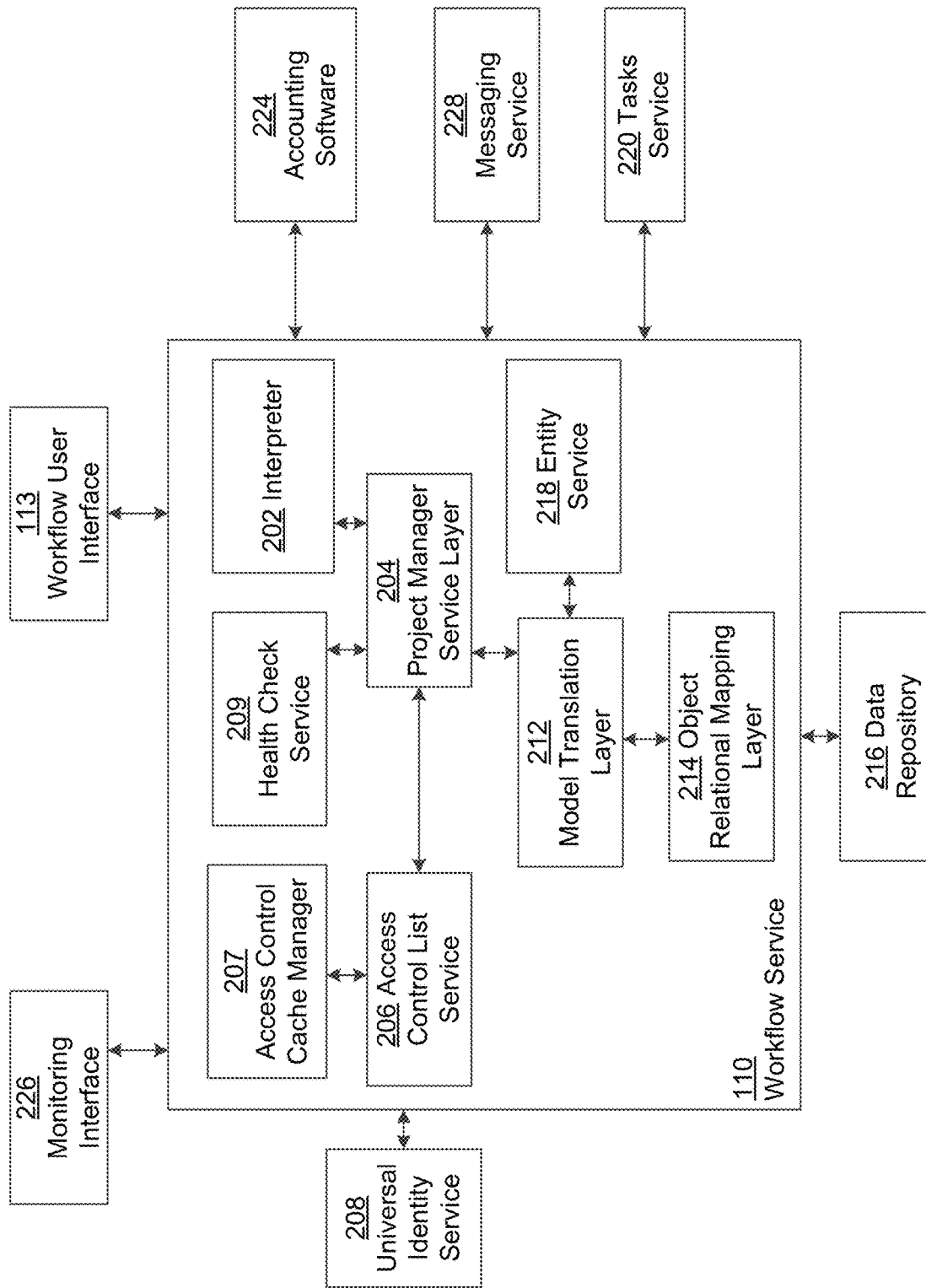

FIG. 2 shows a diagram of the workflow service (110) in accordance with one or more embodiments of the invention. As shown in FIG. 2, the workflow service may include an interpreter (202), a project manager service layer (204), an access control list service (206), access control cache manager (210) a model translation layer (212), an object relational mapping layer (214), entities (218), and health check service (209). The workflow service (110) may interface with identity service (208), a monitoring interface (226), the workflow user interface (113) described above with reference to FIG. 1, accounting software (120) described above with reference to FIG. 1, a messaging service (228), and accounting task service (220). The various components may correspond to hardware, software, firmware or a combination thereof. Each of these components is described below.

The interpreter (202) includes functionality to communicate with the workflow user interface (113). For example, the interpreter (202) may include functionality to obtain a payload of a request and process the payload into parameters of the request. The interpreter (202) further includes functionality to generate a response to a request. For example, the response may be the information to populate into workflow user interface (113).

The project manager service layer (204) includes functionality to manage requests regarding projects and accounting tasks. In other words, the project manager service layer (204) controls the operations of the workflow service. In particular, the project manager service layer (204) includes functionality to initiate an authorization check to ensure that the user is authorized, and to filter information according to the user's role. The project manager service layer (204) further includes functionality to initiate the updating and/or obtaining the data in the data repository, and returning of results to the workflow user interface (113).

The access control list service (206) includes functionality to determine whether the user is allowed to perform specific actions (e.g., assigning a second worker various projects and tasks) and the information that the user is permitted to view. The access control list service (206) may include a cache of the access control list for various workers. The access control list includes various entries. An entry may include information about a worker, the corresponding data, and the access rights that the worker has to the data.

The cache of the access control list may be managed by the access control cache manager (210). In other words, the access control cache manager (210) may include functionality to mark entries of the cache as obsolete, select entries for replacement, and perform other cache management operations.

The access control list service (206) is communicatively connected to the universal identity service (208). The universal identity service (208) maintains a data repository of authentication and authorization information. The universal identity service (208) may provide identity management for multiple services and products.

Continuing with the workflow service (110), the model translation layer (212) includes functionality to translate a model into a request for information from the data repository (216). In other words, the model is a model of the various portions of information to provide in the graphical user interface. The query is the request for information to populate into the model.

The object relational mapping layer (214) includes functionality to change the request to a query for the particular storage structure of the data repository. In other words, the object relational mapping layer (214) provides a layer of abstraction between the business logic of the workflow service (110) and the data repository (216).

The data repository (216) is any type of storage unit and/or device (e.g., a file system, database, collection of tables, or any other storage mechanism) for storing data. Further, the data repository (216) may include multiple different storage units and/or devices. The multiple different storage units and/or devices may or may not be of the same type or located at the same physical site. The data repository (216) includes functionality to store the information described above about each project and accounting tasks. Further, the data repository (216) includes functionality to maintain relationships between projects and accounting tasks. Additionally, the data repository (216) may include functionality to maintain a mapping between accounting functions performed using the accounting software (120).

The entity service (218) includes functionality to assemble the response from the data repository (216) into one or more models and return the results to the project manager service layer (204).

The health check service (209) to monitor operations of the workflow service (110). For example, the health check service (209) may detect inconsistencies in the data repository (216) and update the data repository (216). The health check service (209) may include functionality to interact with monitoring interface (226). The monitoring interface (226) is configured to interact with an administrator user to monitor the operations of the workflow service (110).

The workflow service (110) may further communicate with a messaging service (228) and accounting task service (220). The messaging service (228) includes functionality to manage messages between the various components. The messaging service (228) is a service to synchronize projects with financial transactions with the accounting software (224). Thus, users can see projects created in the accounting software (224) with associated financial transactions. The accounting task service (220) includes functionality to maintain templates relating predefined accounting tasks with projects.

Figure 3:
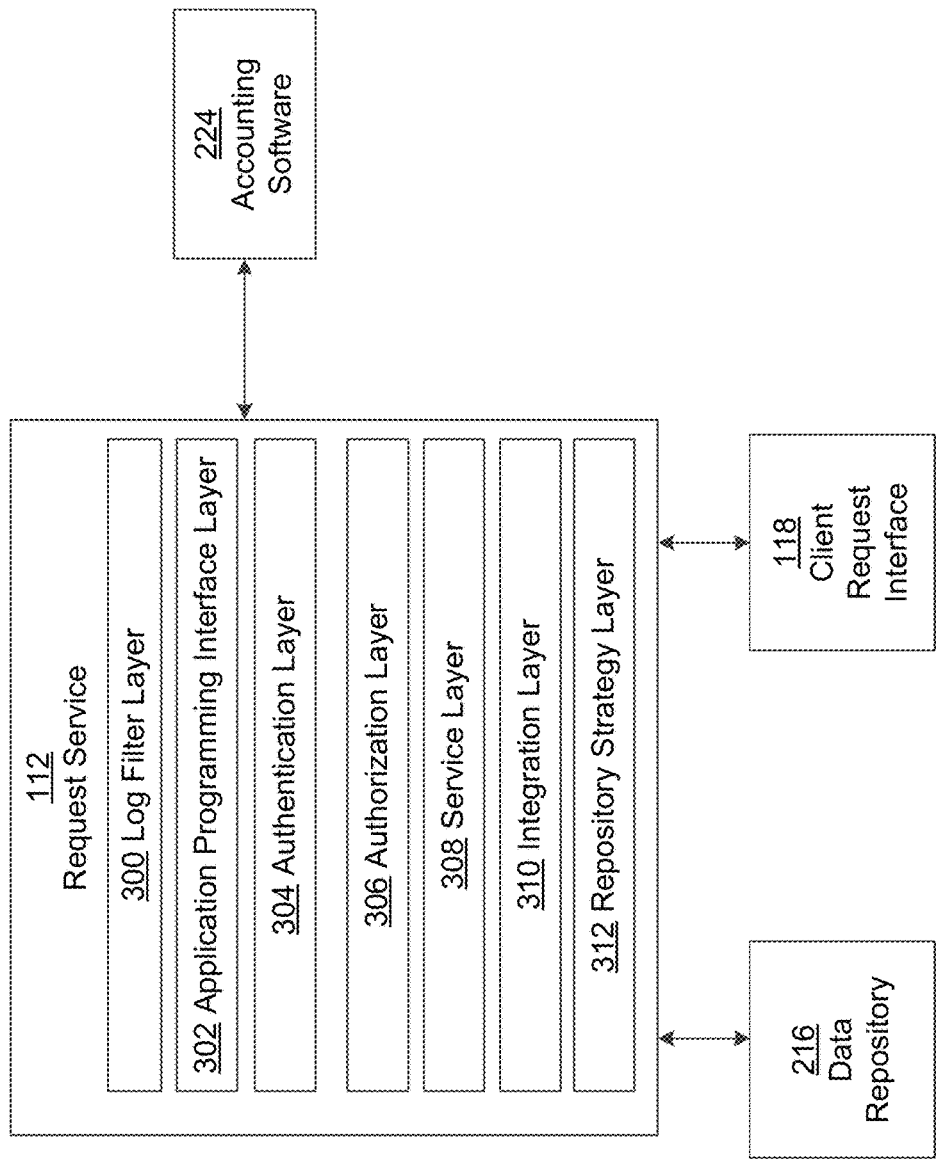

FIG. 3 shows a diagram of the request service (112) in accordance with one or more embodiments of the invention. As discussed above, the request services manage client request between the accounting firm and the clients. The request service (112) includes functionality to match corresponding client requests and responses, track the client requests that have not had a corresponding response or have a client response that is incomplete, and provides a communication channel between the accounting firm and the client(s). The request service (112) may include various layers that provide various functionality. For example, the layers may include a log filter layer (300), an application programming interface layer (302), an authentication layer (304), an authorization layer (306), a service layer (308), an integration layer (310), and a repository strategy layer (312).

The log filter layer (300) includes functionality to log communications to and from the request services (112). The application programming interface layer (302) includes functionality to provide a communication interface for communications between the request service (112) and other applications. The authentication layer (304) includes functionality to authenticate users associated with requests and responses. The authorization layer (306) includes functionality to confirm that a user is valid to access the information using an access control list. The authentication layer (304) and authorization layer (306) may communicate with the universal identity service (208) described above with reference to FIG. 2.

The service layer (308) includes functionality to perform business processing and communicate with the integration layer (310). The repository strategy layer (312) includes functionality to transmit queries to the data repository (314). The data repository (314) is a storage unit or device for storing data. For example, the data repository (314) may be the same or similar to the data repository discussed above with reference to FIG. 1. The data in the data repository (314) may be log information and information about client requests and responses. The data may further include the communications between the client and the accounting firm that are performed via the request service (112).

The request service (112) may be communicatively coupled to the universal identity service, an access service maintaining access control lists, a chat domain service that propagates communications between the client and the worker, a network service that stores interactions between parties, an email service for email communication, a document service that creates a shared folder for document sharing, a data protection service that encrypts various documents and communications, or other services, or any combination thereof. The request service may further communicate with the accounting application (224) to update the accounting application.

While FIGS. 1-3 show a configuration of components, other configurations may be used without departing from the scope of the invention. For example, various components may be combined to create a single component. As another example, the functionality performed by a single component may be performed by two or more components.

FIGS. 4-7 show flowcharts in accordance with one or more embodiments of the invention. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 4:
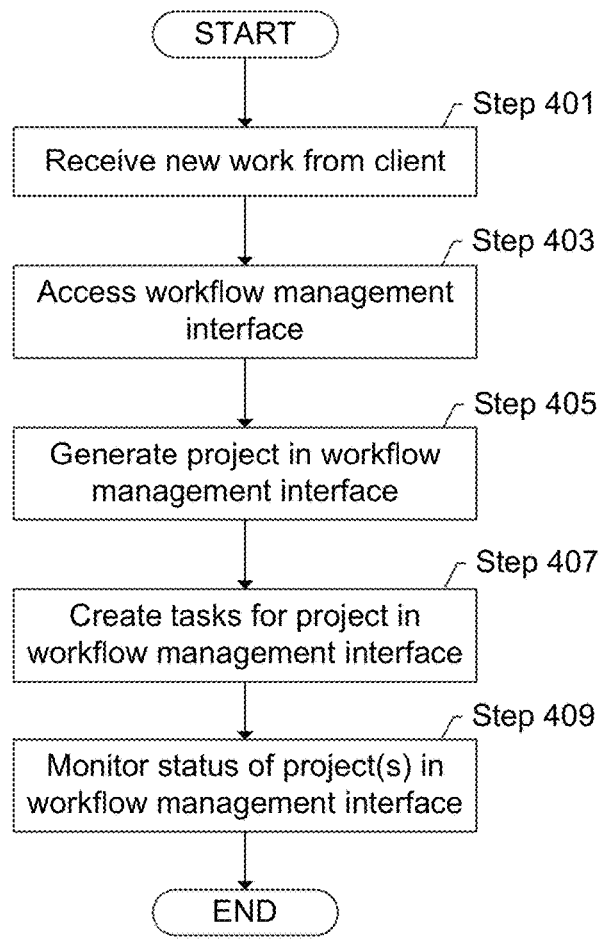
FIGS. 4, 5, 6, and 7 show flowcharts in accordance with one or more embodiments of the invention.

FIG. 4 shows a flowchart for a user to create a project in accordance with one or more embodiments of the invention. In Step 401, the user receives new work from a client. In particular, a client may request a worker, such as the accountant or owner, to perform an accounting project. By way of another example, the client may issue a request to perform a recurring accounting project, such as payroll and bookkeeping.

In Step 403, the user accesses the workflow management interface. For example, the user may open the workflow management interface. The user may invoke the workflow management interface via the accounting application in one or more embodiments. The user may invoke the workflow management interface via an internet browser or other application.

In Step 405, the user generates a project in the workflow management interface. In one or more embodiments, the user selects a generate project user interface widget in the workflow management interface. The user may select a project template, to duplicate an existing project, or to create a new project. For the project, the user may submit one or more of a client name, a title, a description, and a worker to whom the project is assigned. In some embodiments, if the project is based on a project template or to duplicate an existing project, information such as the title and description may be predefined.

In Step 407, the user creates accounting tasks for the project in the workflow management interface. In one or more embodiments, the user defines a set of accounting tasks in the project creation interface. For example, the user may specify one or more a title, a description, and a worker to whom each accounting task is assigned. In one or more embodiments, the accounting tasks may be predefined in the workflow service. In such a scenario, the user may populate existing accounting tasks with information for the particular project. For example, the user may add the worker to whom the accounting task is assigned. The workflow service may calculate the deadlines of the accounting tasks based on the deadline of the project. In other words, in the workflow service, deadlines for accounting tasks may be defined relative to the deadline for the project. Once the deadline for the project is known, the accounting task deadline may be calculated.

In Step 409, the user monitors the status of the project(s) in the workflow management interface. Projects and accounting tasks are provided according to the deadline. Thus, by accessing the project management interface, the user is able to quickly see when various projects or individual accounting tasks are due. Based on the due dates, the user may take various actions, such as complete a project or accounting task or follow-up with another worker about the completion of the project or accounting task. The workflow management interface, the workflow service, and the accounting application are integrated together. Thus, when a status changes in the accounting application as projects or accounting tasks are completed, the status is automatically updated in the workflow management interface. Accordingly, the workers of the accounting firm are able to track projects and accounting tasks without the overhead of updating a tracking tool.

Figure 5:
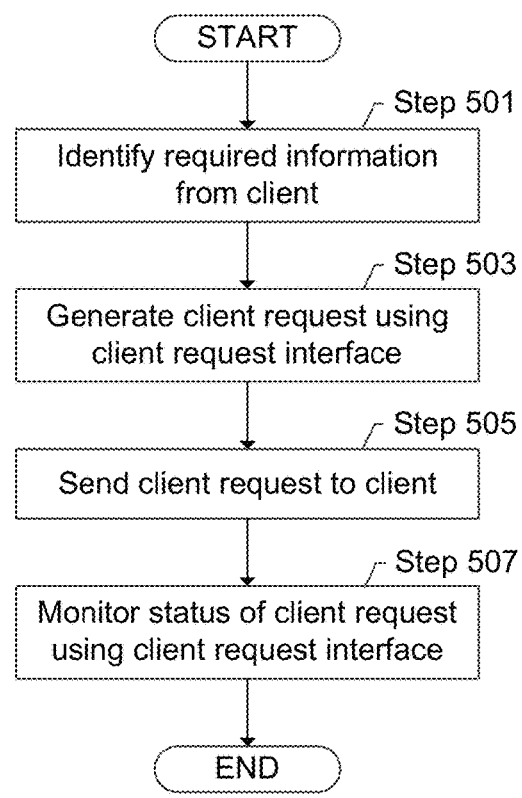

FIG. 5 shows a flowchart for a user to generate a client request in accordance with one or more embodiments of the invention. In some embodiments, as a worker is viewing the various accounting tasks and projects, the worker may determine that additional information is needed before the worker may begin working on the project. The user interface may provide a unified view to the worker whereby the worker may trigger the creation of a client request. FIG. 5 shows a flowchart for a worker to create a client request in accordance with one or more embodiments of the invention. Further, because the status is updated for each user regardless of the worker that performed the accounting task, each user who has the permissions may see the current status of the project. As such, one or more embodiments provide a tool for workers to know the status of the various projects performed by other workers without having to explicitly communicate the status between workers.

In Step 501, the user identifies required information from the client. In viewing the project management interface, the user may determine that some information is needed or useful to complete the accounting task.

In Step 503, the user generates a client request using the client request interface. When the user identifies the required information in the project management interface or in the accounting application interface of the user, the user selects a graphical user interface widget corresponding to the client request interface. The client request interface guides the user through generating a client request. For example, the client request interface may provide to the user a set of optional document descriptions and descriptions of information that the user requires. The user may select from the set and/or submit a customized description. The user may further specify a deadline. In some embodiments, the user may submit a fillable form via the client request interface for the client to fill.

In Step 505, the user sends the client request to the client. Once the user has completed the client request, the user may select a graphical user interface widget to generate the communication. The graphical user interface widget may generate a predefined message that includes the descriptions from Step 503. The user may edit the message or submit the message as is. The request service transmits the message to the client via a selected or predefined communication channel. Selection may be done by a user or the system described above.

In Step 507, the status of the client request is monitored using the client request interface. When the client submits a response to the client request, the user is notified of the response via the user interface. For example, the updated status may be displayed in the project management interface with the deadline for the project to show that the client has responded. The user may select and view the response via the user interface and determine whether to provide additional communication. For example, the response may be complete or incomplete. If incomplete, the user may submit a message for the client request that identifies the additional information required. The request service may transmit the communication to the client along with reminders regarding the material needed. By tracking the documents and information via the project management interface, the user is able to easily determine when the user may start working on the corresponding accounting task or project.

Figure 6:
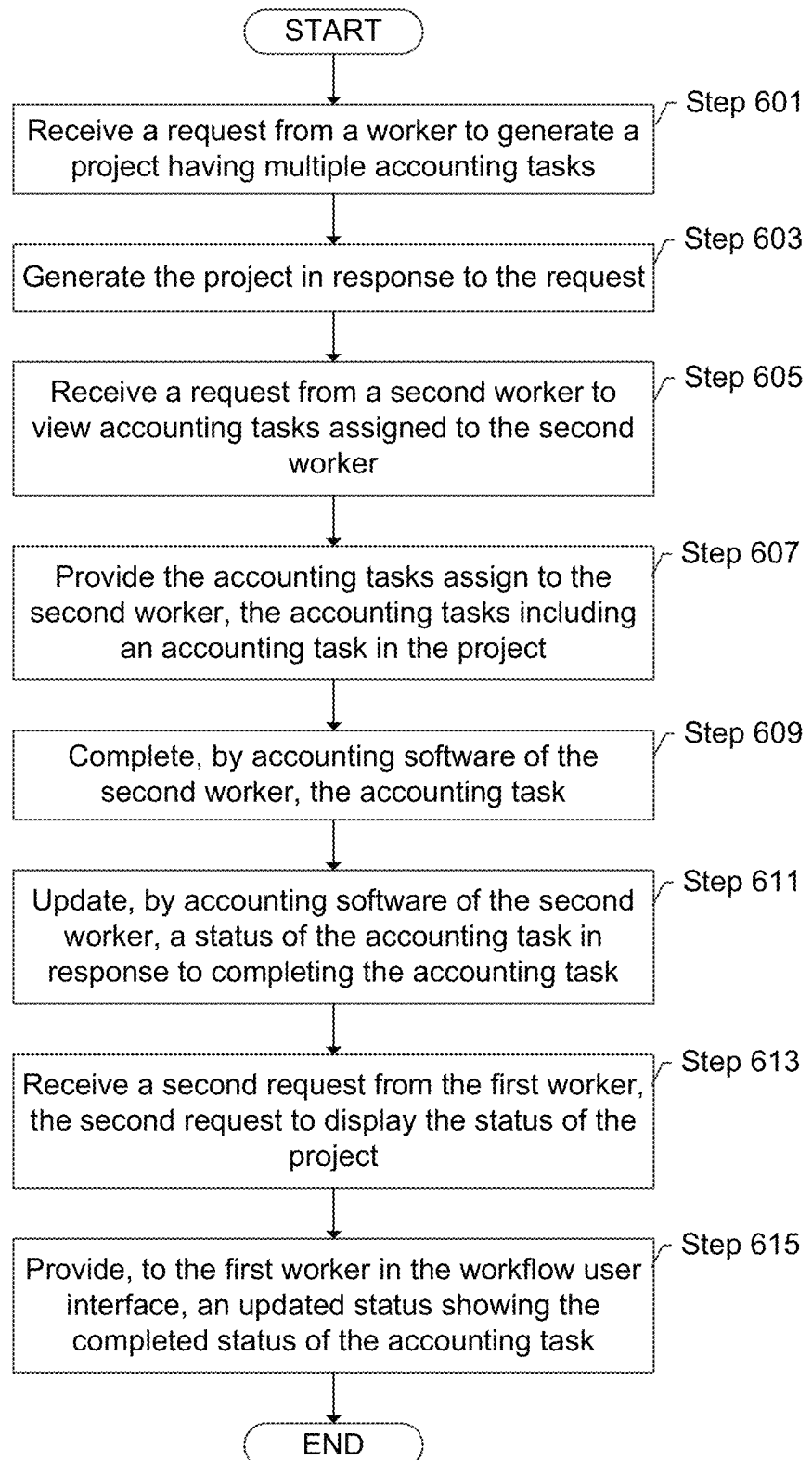

FIG. 6 shows a flowchart for accounting workflow integration in accordance with one or more embodiments of the invention. In particular, FIG. 6 shows a method for the accounting computing device to integrate workflow management with an accounting application across multiple workers of an accounting firm.

In Step 601, a request is received from a first worker to generate a project having multiple accounting tasks. The project management interface may receive a selection of a graphical user interface widget corresponding to the creation of a new project. The selection of the graphical user interface widget causes the project management interface to trigger opening the project creation interface.

In Step 603, the project is generated in response to the request. While the user, who is the first worker, submits various information into the project creation interface, the project creation interface triggers the workflow service to perform backend processing. For example, when the user submits the client name for the project, the workflow service uses an access control list to validate the first worker. In other words, the workflow service determines whether the user may create a project for the client. The workflow service issues a validation result. If the user is not authorized to create the name, then the workflow service may issue a validation result indicating that the user is not authorized. The project creation interface may display an alert that indicates a lack of authorization. If the user is authorized, the validation result may be submitted to the project creation interface that indicates the authorization.

Continuing with the discussion, when the user submits a project name or selects a project type, the project creation interface may transmit the user's submission to the workflow service. The workflow service may determine a project type for the project based on the project name or the type submitted by the user. Using the project type, the workflow service accesses a model corresponding to the project type, where the model identifies the accounting tasks. For example, the workflow service may obtain the model of the accounting tasks using the accounting task service and/or data repository, where the accounting tasks are predefined and match the project name and/or project type. According to the model, the project and the accounting tasks are created. In some embodiments, the workflow service may prepopulate the accounting tasks with information. For example, if the deadline for the project is defined, then the workflow service may prepopulate the accounting tasks with the deadline for each of the accounting tasks. Further, the workflow service may prepopulate the accounting tasks with names and descriptions of the accounting tasks as well as the assigned worker for the accounting task. For example, the assigned worker may be the worker assigned to the project, or a worker in a role that has previously been assigned the accounting task (e.g., for other projects). The workflow service may then transmit the information to the project creation interface. The user may view the accounting tasks and edit the accounting tasks. The edits that may be performed may include changing the task name, the deadline, and the order of the accounting task among other accounting tasks. The edited project and accounting tasks are received by the workflow service, validated, and stored in the data repository.

In Step 605, a request is received from a second worker to view accounting tasks assigned to the second worker. For example, the second worker may separately access the project management interface. In response to the access by the second worker, the project management interface may send a request to the workflow service for projects and accounting task assigned to the second worker. The workflow service may authenticate the request and determine using access control lists, which information that the second worker may view. The workflow service may then access the data repository to obtain the set of projects and accounting tasks that are assigned to the second worker. Each of the set of projects and accounting tasks includes information about the projects/accounting tasks including the deadline and the status. Based on the information from the data repository, the workflow service generates a response to the project management interface that includes the information about each of the projects and accounting tasks for the second worker.

In at least some embodiments, rather than the status being obtained from the data repository of the workflow service, the status may be obtained separately by the workflow service interface. For example, when the accounting software completes an accounting task or project, the accounting software may indicate the completion in a software engine. An aggregator service may obtain the completed status from the software engine and organize information about the completion. A similar technique may be applied when the accounting software determines that an accounting task or project is in progress. After or while receiving the accounting tasks, projects, and corresponding deadlines to display, the workflow user interface may send a query to the aggregator service to obtain the updated status for each of the projects and accounting tasks. In one or more embodiments, the accounting tasks and projects are predefined in the data repository of the workflow service, and the predefined accounting tasks are updated based on a preset match in the system between the accounting tasks and projects in accounting software and the accounting tasks and projects in the workflow user interface.

In one or more embodiments, if the user creates non-predefined accounting tasks or project, then the status of the non-predefined accounting tasks or project is manually updated by a user. An update by one user is propagated to the other users. Thus, if a first worker marks an accounting task as completed, the second worker may see the completed status in the system.

One or more embodiments may provide an interface for a user to define new accounting tasks and projects, and define a relationship between the new accounting tasks and projects to accounting functions performed by the accounting application. The defined relationship may be stored in the workflow user interface, the aggregation service, or the accounting application. Further, the defined relationship may be used for each new accounting task and project of the same type. In other words, if the user creates a new project of the same type as project having the defined relationship, the new project may also be updated using the defined relationship. Using the newly defined relationship, the technique described above may be used to update the status of the accounting task and project in the workflow user interface.

In Step 607, the accounting tasks assigned to the second worker are provided (e.g. by displaying), whereby the accounting tasks include the accounting task for the project. The project management interface displays the accounting tasks according to the deadlines. Each accounting task may further be displayed with the status of the accounting task. In other words, the project management interface is populated with the accounting tasks assigned to the second worker in the order of the deadlines of the accounting task, and with the status. Because of the integration of tools, the second worker may select the accounting task and begin working on the accounting task.

In Step 609, the accounting software of the second worker completes the accounting task. In other words, while the second worker is using the accounting software, accounting software under the control and input of the second worker may complete the accounting task. The accounting software being used by the second worker may be a different instance, version, or type of the accounting software used by the first worker. For example, the second worker may access a web-based accounting software separately from the first worker. By way of another example, the second worker may use accounting software on the second worker's computing device and the first worker may use accounting software on the first worker's computing device.

In Step 611, the accounting software of the second worker updates a status of the accounting task in response to completing the accounting task. In one or more embodiments, the accounting software updates a shared data repository to indicate completion of the accounting task. The shared data repository may be the same or different than the data repository of the workflow service. The updated status may be transmitted to the data repository of the workflow service or accessed from the data repository of the accounting software.

In Step 613, a second request is received from the first worker, the second request being to display the status of the project. Periodically, the first worker may monitor the status of the projects and accounting tasks via the project management interface. For example, the first worker may access the project management interface separate from the second worker. In response to the access by the first worker, the project management interface may send a request to the workflow service for projects and accounting task that the first worker may view. The workflow service may authenticate the request and determine using access control lists, which information that the first worker may view. The workflow service may then access the data repository to obtain the set of projects and accounting tasks that are viewable by the first worker. Each of the set of projects and accounting tasks includes information about the projects/accounting tasks including the deadline and the status. Based on the information from the data repository, the workflow service generates a response to the project management interface that includes the information about each of the projects and accounting tasks. Because of the integration through the shared data repository, the completed status of the accounting task performed by the second worker is in the information that is transmitted to the project management interface.

In Step 615, an updated status showing the completed status of the accounting task is provided to the first worker in the workflow user interface. In other words, the various projects and accounting tasks are displayed in the project management interface. The first worker may view the various projects and accounting tasks. In the display, the updated status is shown so that the first worker is able to identify the accounting tasks that are completed and the accounting tasks and projects that need to be completed, reviewable by the first worker.

Figure 7:
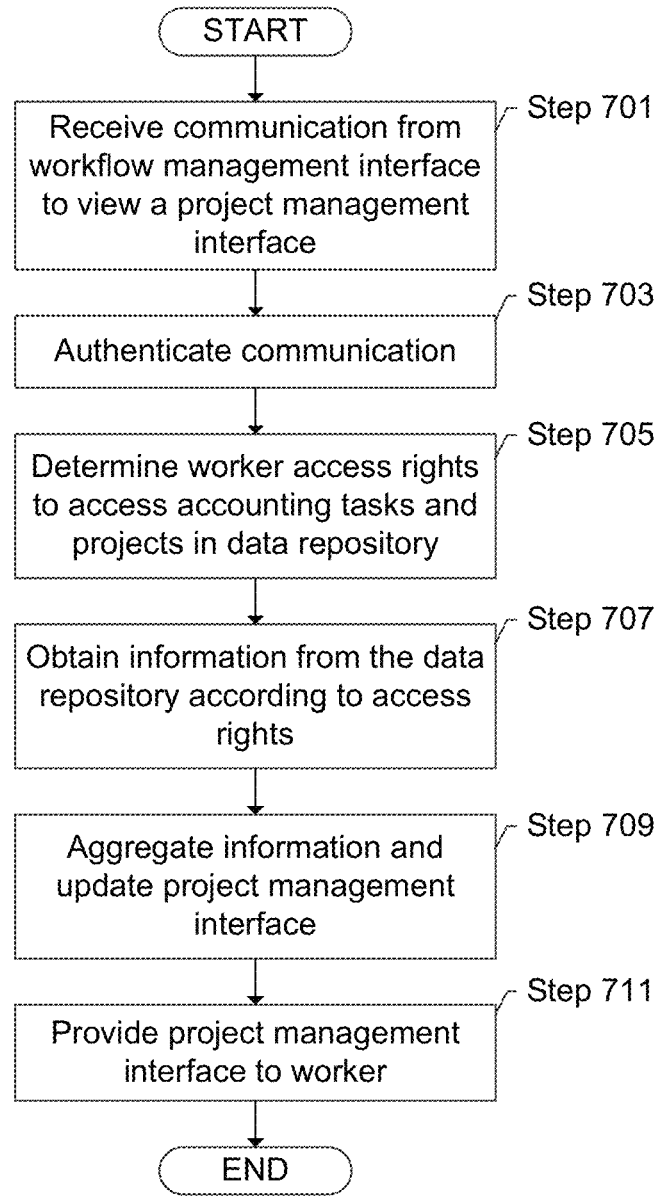

FIG. 7 shows a flowchart for processing requests for information from the workflow service interface by the workflow service. In Step 701, a communication is received from the workflow management interface to view the project management interface. In Step 703, the communication is authenticated. Data starts with workflow user interface, and then the information flows through the API gateway. Once the communication is authenticated, the communication goes to workflow service. Interpreter obtains parameters and interprets the communication passing the payload to the project manager service layer.

In Step 705, the worker's access rights to access accounting tasks and projects in the data repository are determined. The project manager service layer calls access control list service. The access control list service validates that the user is authorized and has access based on a matrix of permissions. For example, the access control list service may determine whether the current user has access to particular client. To perform the authorization, the access control list service may access the universal identity service to get cache information. In one or more embodiments, the access control list service also determines if the second worker assigned to projects and/or tasks is authorized to access that client. In a preferred embodiment, the access control list service determines if multiple workers assigned to the same or different projects and/or tasks are authorized to access particular clients.

In some embodiments, the access control list service may use a batching mechanism using a queue that aggregates received information together. The batching mechanism may be used so as to not overload the universal identity service. In particular, a worker may have various privileges with regards to accessing client information, so the request to view all the accounting tasks assigned to the user may be large. The access control list service may partition the single request into multiple requests, then send the request to the universal identity service. The responses from the universal identity service are then aggregated. By way of a more specific example, a worker may have many relationships that need to be queried. In one or more embodiments, the single request for all of the worker's relationships may be transformed into twenty-five or thirty-five requests. In other embodiments, the single request may be transformed into a smaller or greater number of requests. The various responses to the requests are then assembled, aggregated, validated to generate an aggregated result. The aggregated result refers to the access, permissions, and client relationships to the accounting firm of the user. Once the access control list service has the authorization information, the access control list service responds to project manager service layer.

In Step 707, the information from the data repository is obtained according to the access rights. The project manager service layer may use the original payload to validate and ensure that a model complies with business requirements. The project manager service layer sends model to model translation layer, which translates model to query. The query is sent to data repository via the object relational mapping layer to obtain the projects. Once the project manager server layer obtains the projects for the worker, the projects are transmitted to the entities service. The entities service assembles the model and returns results to project manager service layer. The project manager service layer sends a message to the accounting task service to obtain accounting tasks associated with the project. If accounting task service is down, then project manager service layer may obtain the accounting tasks directly. The project manager service layer may have a synchronizing mechanism to synchronize with accounting task service. A self-healing mechanism may be used such that if information is incorrect in data repository, then the project services layer uses accounting tasks service to correct the data repository.

In Step 709, the information is aggregated and used to update the project management interface. Once project manager services layer has the information on project and associated accounting tasks, the project manager services layer sends the information to the interpreter. The interpreter translates the information to a payload that is returned to workflow user interface.

Figure 8:
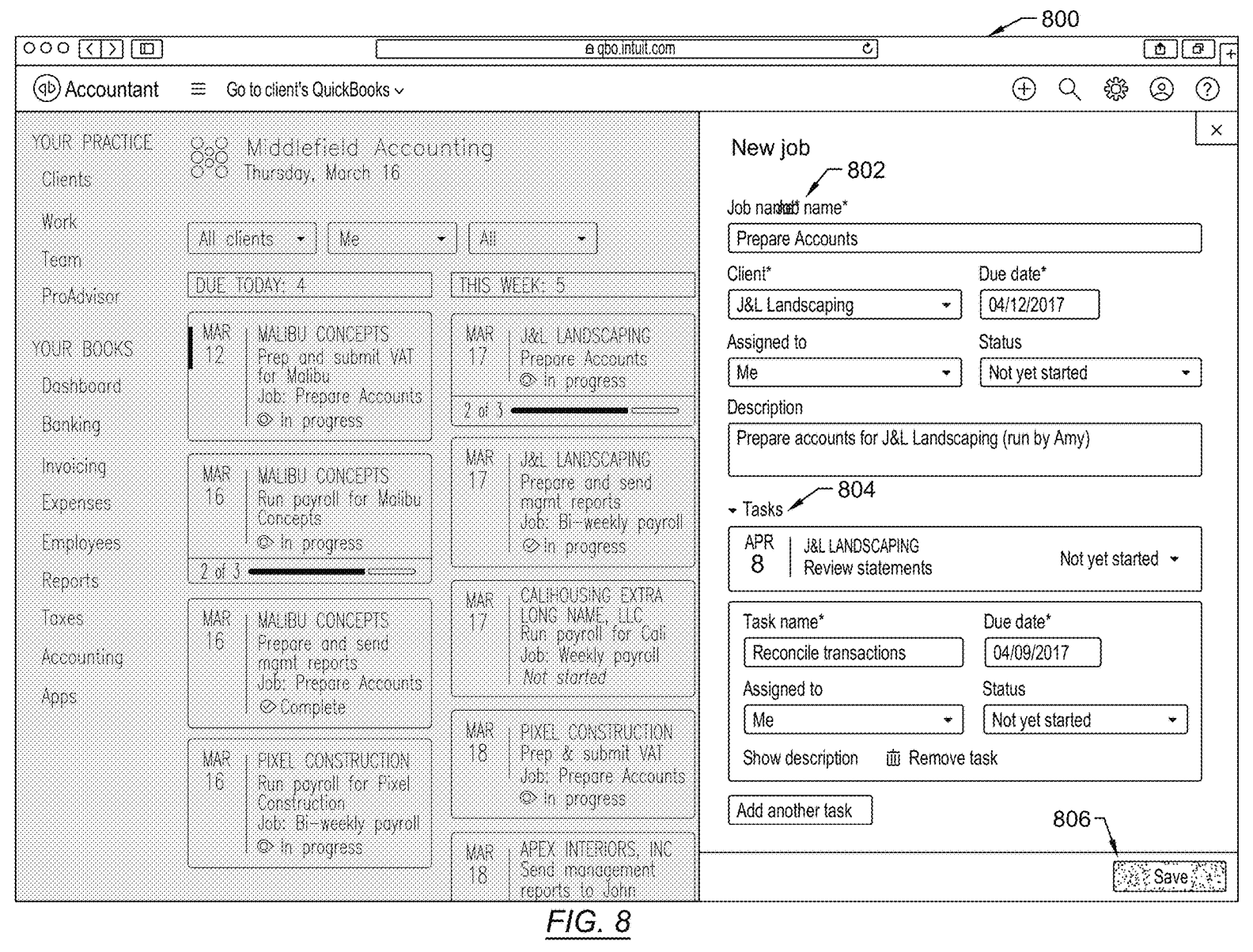
Figure 9:
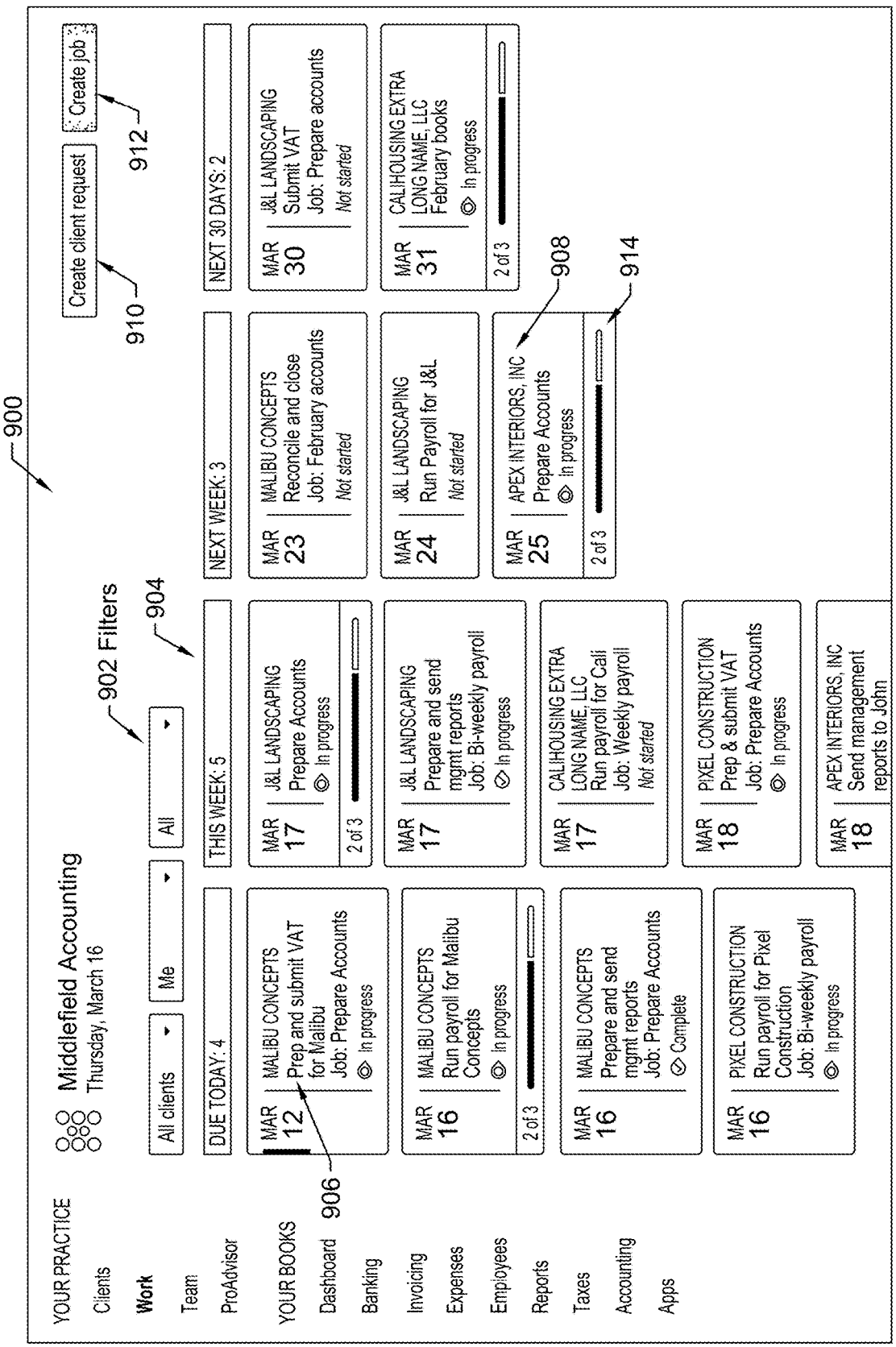
Figure 10:
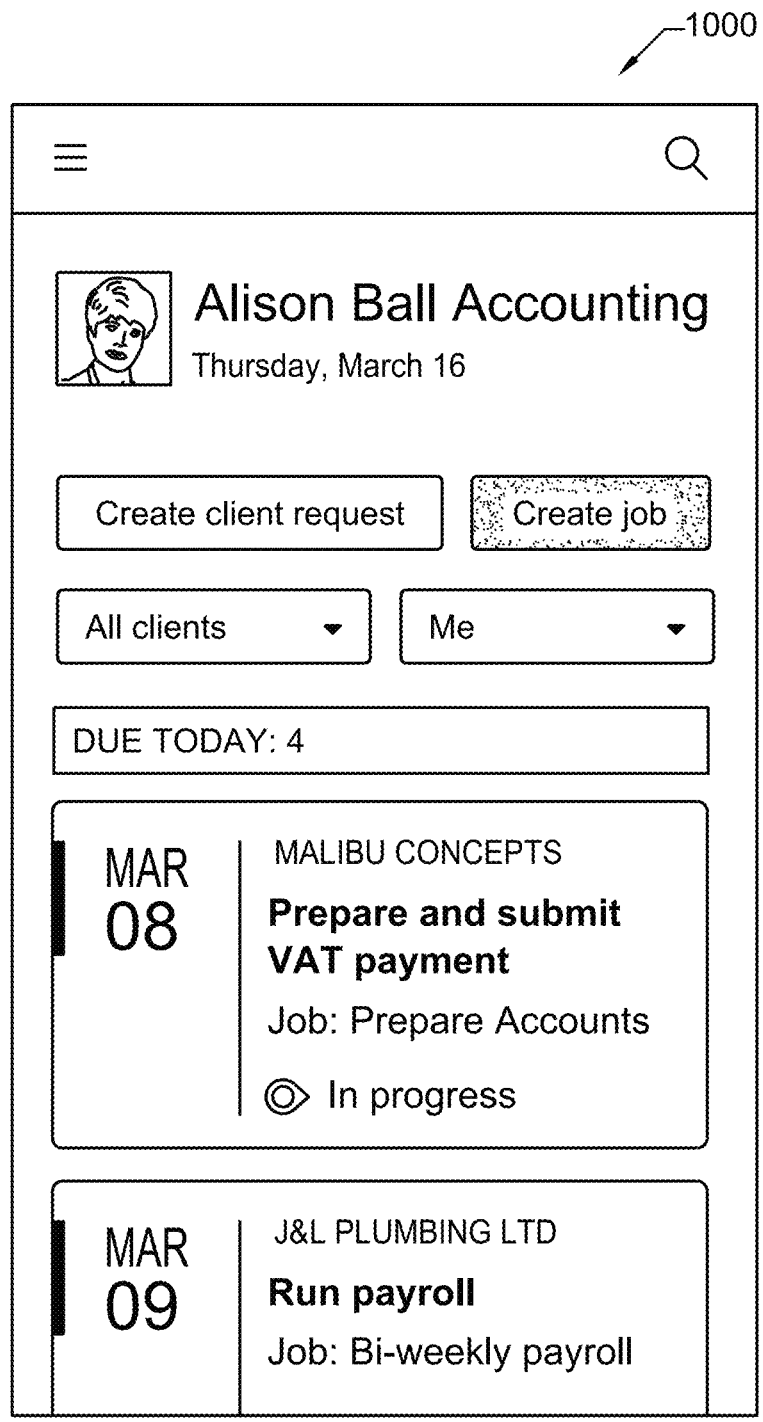

FIGS. 8, 9, and 10 show example user interfaces in accordance with one or more embodiments of the invention. The following examples are for explanatory purposes only and not intended to limit the scope of the invention.

FIG. 8 shows an example project creation interface (800) in accordance with one or more embodiments of the invention. As shown in FIG. 8, the project creation interface allows the user to create a new project (i.e., job). The user may submit a job name, client identifier, deadline, assigned worker, status and description in the project information portion (802). Further, the user may add various accounting tasks using the accounting task information portion (804) of the project creation interface (800). Each accounting task may have a separate assigned worker, a deadline, name, status, and description. The accounting tasks may be reordered from the order in which the accounting tasks are entered. By selecting save, the new project is stored.

FIG. 9 shows an example project management interface (900) in accordance with one or more embodiments of the invention. The project management interface (900) is shown in a calendar view. As shown, the project management interface (900) allows the user to apply various filters (902) to the information displayed. Further, the accounting tasks and projects may be displayed as virtual cards in column format, where each column is for today, or a future week (e.g., this week column (904)). The accounting tasks (e.g., accounting task card (906)) include a project name (i.e., job name) under the name of the accounting task. In specific referenced accounting task card (906), the project name is "prepare accounts." Each accounting task and project card has a corresponding status identifier (e.g., not started, in progress, complete). For projects (e.g., project card (908)), the status may include a status bar (914) specifying a number of accounting tasks in the project that are completed and not completed. Thus, viewing the workflow management interface, the worker is able to quickly identify the status and due dates of the worker's projects and accounting tasks. Additionally, by selecting create client request button (910), the worker may create a new client request. By selecting create job button (912), the worker may create a new project and be guided to the interface shown in FIG. 8.

FIG. 10 shows an example mobile version of a project management interface (1000) in accordance with one or more embodiments of the invention. The mobile version allows the user to view the same information shown in FIG. 9, in a compact version. By scrolling down in the mobile version, the user may determine which projects are due along with the status of each project.

Embodiments of the invention may be implemented on a computing system. Any combination of mobile, desktop, server, router, switch, embedded device, or other types of hardware may be used. For example, as shown in FIG. 11.1, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1100) in FIG. 11.1 may be connected to or be a part of a network. For example, as shown in FIG. 11.2, the network (1120) may include multiple nodes (e.g., node X (1122), node Y (1124)). Each node may correspond to a computing system, such as the computing system shown in FIG. 11.1, or a group of nodes combined may correspond to the computing system shown in FIG. 11.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1100) may be located at a remote location and connected to the other elements over a network.

Although not shown in FIG. 11.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11.1. Further, the client device (1126) may include and/or perform all or a portion of one or more embodiments of the invention.

The computing system or group of computing systems described in FIGS. 11.1 and 11.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 11.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 11.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11.1 may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 11.1 and the nodes and/or client device in FIG. 11.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of accounting workflow integration, the method comprising:
receiving, by a workflow user interface, a first request from a first worker to generate a first project comprising a first plurality of accounting tasks, the first request comprising an assignment of an accounting task in the first plurality of accounting tasks to a second worker;
generating the first project in response to the request, wherein the accounting task is displayed as part of a first virtual card with a first status bar for a status of the accounting task;
providing, by the workflow user interface to the second worker, the accounting task and an accounting task deadline to complete the accounting task in response to the assignment;
completing, by accounting software of the second worker, the accounting task;
updating, by the accounting software of the second worker, a status of the accounting task in response to completing the accounting task, by the second worker, to generate an updated status;
receiving a second request from the first worker, the second request to display a calendar view of the workflow user interface;
displaying, in the calendar view to the first worker, a plurality of virtual cards organized by a due date of a corresponding project in the plurality of projects,
each virtual card of the plurality of virtual cards corresponding to a single project of the plurality of projects and comprising a status bar,
the plurality of virtual cards comprising the first virtual card displaying the first status bar with the updated status and a first status identifier,
the first status bar for the first project showing a proportion of the first plurality of accounting tasks that have been completed as the updated status,
the plurality of virtual cards displayed within a plurality of columns,
each column displaying a column identifier string comprising a duration identifier and a numeric project count identifier, and
the column identifier string above a first subset of the plurality of virtual cards; and
automatically updating the first status bar displayed to the first worker with the updated status in response to the accounting task being completed.

2. The method of claim 1,
wherein generating the project comprises:
   determining a project type for the project;
   accessing a model corresponding to the project type, the model identifying the first plurality of accounting tasks; and
   creating the project and the first plurality of accounting tasks according to the model.

3. The method of claim 2, further comprising:
obtaining a project deadline for the project; and
prepopulating the first plurality of accounting tasks with the accounting task deadline for at least one of the first plurality of accounting tasks.

4. The method of claim 1, further comprising:
validating, using an access control list, in response to receiving the first request from the first worker that the first worker is authorized to create the project to generate a validation result; and
issuing the validation result to a project manager service layer, wherein the project manager server layer manages generation of the project based on the validation result.

5. The method of claim 1, further comprising:
receiving an access control request to view a plurality of accounting tasks assigned to the second worker;
partitioning the access control request into a plurality of requests;
sending the plurality of requests to a universal identity service;
receiving a plurality of responses to the plurality of request from the universal identity service;
aggregating the plurality of responses into an aggregated result; and
determining the plurality of accounting tasks assigned to the second worker from the aggregated result.

6. The method of claim 1, further comprising:
receiving a client request in the workflow user interface from the second worker, the client request comprising a request for a plurality of documents from a client to complete the accounting task;
sending the client request via a request service to accounting software of the client;
tracking, by the request service, a status of receiving the plurality of documents across a plurality of communications from the client; and
updating the workflow user interface for the second worker based on the status of receiving the plurality of documents.

7. The method of claim 6, wherein the accounting software of the client interfaces with the request service to upload at least one document of the plurality of documents.

8. The method of claim 6, wherein the accounting software of the client comprises a messaging interface for communicating with the second worker via the request service.

9. The method of claim 1, wherein the first worker has a first role at an accounting firm, wherein the second worker has a second role at the accounting firm, the method further comprising:
   providing, to the first worker in the workflow user interface, the updated status;
   populating a worker view of a project management interface with a second plurality of accounting tasks assigned to the second worker;
   providing, based on the second role, the worker view of the project management interface to the second worker;
   populating a client view of the project management interface with a third plurality of accounting tasks due for a plurality of clients of the accounting firm; and
   providing, based on the first role, the client view of the project management interface to the first worker.

10. A system for integrating accounting task management with accounting software, the system comprising:
   a computer processor;
   accounting software of a second worker executing on the computer processor configured to:
      complete an accounting task in a first plurality of accounting tasks, and
      update a status of the accounting task in response to completing the accounting task, by the second worker, to generate an updated status; and
   a workflow user interface executing on the computer processor configured to:
      receive a first request from a first worker to generate a first project comprising the first plurality of accounting tasks, the first request comprising an assignment of an accounting task in the first plurality of accounting tasks to the second worker,
      generate the first project in response to the request,
      wherein the accounting task is displayed as part of a first virtual card with a first status bar for a status of the accounting task;
      provide, to the second worker, the accounting task and an accounting task deadline to complete the accounting task in response to the assignment,
      receive a second request from the first worker, the second request to display a calendar view of the workflow user interface,
      display, in the calendar view to the first worker, a plurality of virtual cards organized by a due date of a corresponding project in the plurality of projects,
         each virtual card of the plurality of virtual cards corresponding to a single project of the plurality of projects and comprising a status bar,
         the plurality of virtual cards comprising the first virtual card displaying the first status bar with the updated status and a first status identifier,
         the first status bar for the first project showing a proportion of the first plurality of accounting tasks that have been completed as the updated status,
         each column displaying a column identifier string comprising a duration identifier and a numeric project count identifier, and
         the column identifier string above a first subset of the plurality of virtual cards, and
      automatically update the first status bar displayed to the first worker with the updated status in response to the accounting task being completed.

11. The system of claim 10, further comprising:
a workflow service communicatively connected to the workflow user interface, the workflow service executing on the computer processor configured to:
   generate the project based on a request from the workflow user interface to generate the project.

12. The system of claim 10,
further comprising:
   a workflow service communicatively connected to the workflow user interface, the workflow service executing on the computer processor configured to:
      determine a project type for the project,
      access a model corresponding to the project type, the model identifying the first plurality of accounting tasks, and create the project and the first plurality of accounting tasks according to the model.

13. The system of claim 10, further comprising:
an access control list service executing on the computer processor configured to:
validate, using an access control list, in response to receiving the first request from the first worker that the first worker is authorized to create the project to generate a validation result, and
issue the validation result to a project manager service layer, wherein the project manager server layer manages generation of the project based on the validation result.

14. The system of claim 10,
wherein the workflow user interface is further configured to receive a client request from the second worker, the client request comprising a request for a plurality of documents from a client to complete the accounting task, and
wherein the system further comprises a request service executing on the computer processor configured to:
track a status of receiving the plurality of documents across a plurality of communications from the client, and
update the workflow user interface for the second worker based on the status of receiving the plurality of documents.

15. The system of claim 14, wherein the request service is further configured to interface with accounting software of the client to upload at least one document of the plurality of documents.

16. The system of claim 14, wherein the request service is further configured to pass messages between the client and the second worker via the accounting software of the client.

17. A graphical user interface (GUI) comprising executable code stored in a memory and executed on a computer processor, the GUI further comprising:
a workflow user interface configured to:
receive a first request from a first worker to generate a first project comprising a first plurality of accounting tasks, the first request comprising an assignment of an accounting task in the first plurality of accounting tasks to a second worker, wherein the first project is generated in response to the request,
wherein the accounting task is displayed as part of a first virtual card with a first status bar for a status of the accounting task;
provide the accounting task and an accounting task deadline to complete the accounting task in response to the assignment;
update a status of the accounting task to generate an updated status in response to the accounting task being completed, by the second worker, while connected to the second worker;
receive a second request from the first worker, the second request to display a calendar view of the workflow user interface;
display, in the calendar view to the first worker, a plurality of virtual cards organized by a due date of a corresponding project in the plurality of projects, each virtual card of the plurality of virtual cards corresponding to a single project of the plurality of projects and comprising a status bar,
the plurality of virtual cards comprising the first virtual card displaying the first status bar with the updated status and a first status identifier,
the first status bar for the first project showing a proportion of the first plurality of accounting tasks that have been completed as the updated status,
each column displaying a column identifier string comprising a duration identifier and a numeric project count identifier, and
the column identifier string above a first subset of the plurality of virtual cards, and
automatically update the first status bar displayed to the first worker with the updated status in response to the accounting task being completed.

18. The GUI of claim 17,
wherein generating the project comprises:
determining a project type for the project;
accessing a model corresponding to the project type, the model identifying the first plurality of accounting tasks; and
creating the project and the first plurality of accounting tasks according to the model.

19. The GUI of claim 18, wherein the workflow user interface is further configured to:
obtain a project deadline for the project; and
prepopulate the first plurality of accounting tasks with the accounting task deadline for at least one of the first plurality of accounting tasks.

20. The GUI of claim 17, wherein the workflow user interface is further configured to:
validate, in response to receiving the first request from the first worker, that the first worker is authorized to create the project to generate a validation result; and
issue the validation result to a project manager service layer, wherein the project manager server layer manages generation of the project based on the validation result.

* * * * *

UNITED STATES PATENT AND TRADEMARK OFFICE
CERTIFICATE OF CORRECTION

PATENT NO. : 10,984,484 B1  
APPLICATION NO. : 15/663648  
DATED : April 20, 2021  
INVENTOR(S) : Priscilla Jane Nidecker et al.

Page 1 of 1

It is certified that error appears in the above-identified patent and that said Letters Patent is hereby corrected as shown below:

In the Claims

At Column 23, Claim number 4, Line number 21, the word "server" should read -- service --.

At Column 25, Claim number 13, Line number 11, the word "server" should read -- service --.

At Column 26, Claim number 20, Line number 48, the word "server" should read -- service --.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*